United States Patent
Oelkfe et al.

(10) Patent No.: US 9,463,417 B2
(45) Date of Patent: Oct. 11, 2016

(54) LOW EMISSION POWER GENERATION SYSTEMS AND METHODS INCORPORATING CARBON DIOXIDE SEPARATION

(75) Inventors: Russell H. Oelkfe, Houston, TX (US); Richard A. Huntington, Houston, TX (US); Franklin F. Mittricker, Jamul, CA (US)

(73) Assignee: ExxonMobil Upstream Research Company, Spring, TX (US)

( * ) Notice: Subject to any disclaimer, the term of this patent is extended or adjusted under 35 U.S.C. 154(b) by 385 days.

(21) Appl. No.: 14/004,840

(22) PCT Filed: Mar. 5, 2012

(86) PCT No.: PCT/US2012/027781
§ 371 (c)(1),
(2), (4) Date: Sep. 12, 2013

(87) PCT Pub. No.: WO2012/128929
PCT Pub. Date: Sep. 27, 2012

(65) Prior Publication Data
US 2014/0047818 A1  Feb. 20, 2014

Related U.S. Application Data

(60) Provisional application No. 61/542,041, filed on Sep. 30, 2011, provisional application No. 61/542,030, filed on Sep. 30, 2011, provisional application No. 61/466,384, filed on Mar. 22, 2011, provisional (Continued)

(51) Int. Cl.
*B01D 53/62* (2006.01)
*F02C 1/08* (2006.01)
*F02C 3/34* (2006.01)

(52) U.S. Cl.
CPC .............. *B01D 53/62* (2013.01); *F02C 1/08* (2013.01); *F02C 3/34* (2013.01);

(Continued)

(58) Field of Classification Search
CPC ............ Y02C 10/06; F02C 1/08; F02C 1/10; F02C 3/34; F02C 6/06; F02C 6/08; F02C 6/01; F02C 9/18; F05D 2260/61; B01D 53/62; B01D 53/92
See application file for complete search history.

(56) References Cited

U.S. PATENT DOCUMENTS 2,488,911 A   11/1949   Hepburn et al.
2,884,758 A   5/1959    Oberle
(Continued)

FOREIGN PATENT DOCUMENTS

CA   2231749   9/1998
CA   2550675   7/2005
(Continued)

OTHER PUBLICATIONS

Ahmed, S. et al. (1998) "Catalytic Partial Oxidation Reforming of Hydrocarbon Fuels," *1998 Fuel Cell Seminar*, Nov. 16-19, 1998, 7 pgs.

(Continued)

*Primary Examiner* — Andrew Nguyen
(74) *Attorney, Agent, or Firm* — ExxonMobil Upstream Research Company Law Department

(57) ABSTRACT

Methods and systems for $CO_2$ separation in low emission power plants are provided. One system includes a gas turbine system that combusts a fuel and an oxidant in the presence of a compressed recycle stream to provide mechanical power and a gaseous exhaust. A purge stream is taken from the compressed recycle stream and directed to a $CO_2$ separator configured to absorb $CO_2$ from the purge stream using a potassium carbonate solvent. Volatiles are removed from the rich solvent by stripping or by flashing to an intermediate pressure before the rich solvent is regenerated and $CO_2$ is removed.

34 Claims, 5 Drawing Sheets

Related U.S. Application Data application No. 61/542,031, filed on Sep. 30, 2011, provisional application No. 61/466,385, filed on Mar. 22, 2011, provisional application No. 61/542,035, filed on Sep. 30, 2011, provisional application No. 61/466,381, filed on Mar. 22, 2011.

(52) U.S. Cl.
CPC .. *B01D 2251/306* (2013.01); *B01D 2251/606* (2013.01); *B01D 2257/504* (2013.01); *F05D 2260/61* (2013.01); *Y02C 10/04* (2013.01); *Y02C 10/06* (2013.01); *Y02E 20/16* (2013.01)

(56) References Cited

U.S. PATENT DOCUMENTS

| | | |
|---|---|---|
| 3,561,895 A | 2/1971 | Michelson |
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis, III et al. |
| 3,926,591 A * | 12/1975 | Wildmoser ............... C07C 7/11 423/229 |
| 3,949,548 A | 4/1976 | Lockwood, Jr. |
| 4,002,721 A * | 1/1977 | Guffy ................. B01D 53/1493 423/226 |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz, III |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A * | 7/1985 | Stahl .................... F01K 23/064 60/39.52 |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson, Jr. et al. |
| 5,956,937 A | 9/1999 | Beichel |

(56) References Cited

U.S. PATENT DOCUMENTS

| | | | |
|---|---|---|---|
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,490,858 B2 | 12/2002 | Barrett et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier, Jr. |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,640,548 B2 | 11/2003 | Brushwood et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Garry et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |

(56) References Cited

U.S. PATENT DOCUMENTS

| | | |
|---|---|---|
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear, Jr. et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman, II et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Dalla Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Huntley Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,901,488 B2 | 3/2011 | Rochelle et al. ............... 95/161 |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |

(56) References Cited

U.S. PATENT DOCUMENTS

| | | | |
|---|---|---|---|
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,034,166 B2 | 10/2011 | Asprion et al. ............... 95/236 |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,555,796 B2 | 10/2013 | D'Agostini |
| 8,567,200 B2 | 10/2013 | Brook et al. |
| 8,616,294 B2 | 12/2013 | Zubrin et al. |
| 8,627,643 B2 | 1/2014 | Chillar et al. |
| 2001/0000049 A1 | 3/2001 | Kataoka et al. |
| 2001/0029732 A1 | 10/2001 | Bachmann |
| 2001/0045090 A1 | 11/2001 | Gray, Jr. |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0112696 A1* | 6/2006 | Lynghjem ............. B01D 53/62 60/772 |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0006592 A1* | 1/2007 | Balan ..................... F02C 3/22 60/772 |
| 2007/0028774 A1* | 2/2007 | Rochelle ........... B01D 53/1425 95/236 |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |

(56) References Cited

U.S. PATENT DOCUMENTS

| | | |
|---|---|---|
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman, II et al. |
| 2009/0193809 A1 | 8/2009 | Schroder et al. |
| 2009/0199566 A1* | 8/2009 | Lebas .................. F02C 3/34 60/772 |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0111784 A1* | 5/2010 | Mak .................. B01D 53/1406 422/600 |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0267123 A1* | 10/2010 | Wibberley ......... B01D 53/1425 435/266 |
| 2010/0278710 A1* | 11/2010 | Sato .................. B01D 53/75 423/437.1 |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |

FOREIGN PATENT DOCUMENTS

| | | |
|---|---|---|
| CA | 2645450 | 9/2007 |
| CA | 2614669 | 12/2008 |
| EP | 0453059 | 6/1994 |
| EP | 0770771 | 5/1997 |
| EP | 0654639 | 9/1998 |
| GB | 0776269 | 6/1957 |
| GB | 2117053 | 10/1983 |
| GB | 2397349 | 7/2004 |
| WO | WO95/21683 | 8/1995 |
| WO | WO97/07329 | 2/1997 |
| WO | WO99/06674 | 2/1999 |
| WO | WO99/63210 | 12/1999 |
| WO | WO2005/064232 | 7/2005 |
| WO | WO2006/107209 | 10/2006 |
| WO | WO2007/068682 | 6/2007 |
| WO | WO2008/074980 | 6/2008 |
| WO | WO2008/142009 | 11/2008 |
| WO | WO2008/155242 | 12/2008 |
| WO | WO2009/120779 | 10/2009 |
| WO | WO2009/121008 | 10/2009 |
| WO | WO2010/044958 | 4/2010 |
| WO | WO2010/066048 | 7/2010 |
| WO | WO2010/141777 | 12/2010 |
| WO | WO2011/003606 | 1/2011 |
| WO | WO2011/028322 | 3/2011 |
| WO | WO2012/003076 | 1/2012 |
| WO | WO2012/003077 | 1/2012 |
| WO | WO2012/003078 | 1/2012 |
| WO | WO2012/003079 | 1/2012 |
| WO | WO2012/003080 | 1/2012 |
| WO | WO2012003489 | 1/2012 |
| WO | WO2012/018458 | 2/2012 |
| WO | WO2012/018459 | 2/2012 |
| WO | WO2012128928 | 9/2012 |
| WO | WO2012128929 | 9/2012 |
| WO | WO2012170114 | 12/2012 |
| WO | WO2013147632 | 10/2013 |
| WO | WO2013147633 | 10/2013 |

(56) References Cited

FOREIGN PATENT DOCUMENTS

| WO | WO2013155214 | 10/2013 |
|---|---|---|
| WO | WO2013163045 | 10/2013 |

OTHER PUBLICATIONS

Air Separation Technology Ion Transport Membrane—Air Products 2008.
Air Separation Technology Ion Transport Membrane—Air Products 2011.
Anderson, R. E. (2006) "Durability and Reliability Demonstration of a Near-Zero-Emission Gas-Fired Power Plant," *California Energy Comm., CEC 500-2006-074*, 80 pgs.
Baxter, E. et al. (2003) "Fabricate and Test an Advanced Non-Polluting Turbine Drive Gas Generator," *U. S. Dept. of Energy, Nat'l Energy Tech. Lab., DE-FC26-00NT 40804*, 51 pgs.
Bolland, O. et al. (1998) "Removal of CO2 From Gas Turbine Power Plants Evaluation of Pre- and Postcombustion Methods," SINTEF Group, 1998, www.energy.sintef.no/publ/xergi/98/3/art-8engelsk.htm, 11 pgs.
BP Press Release (2006) "BP and Edison Mission Group Plan Major Hydrogen Power Project for California," Feb. 10, 2006, www.bp.com/hydrogenpower, 2 pgs.
Bryngelsson, M. et al. (2005) "Feasibility Study of CO2 Removal From Pressurized Flue Gas in a Fully Fired Combined Cycle—The Sargas Project," KTH—Royal Institute of Technology, Dept. of Chemical Engineering and Technology, 9 pgs.
Clark, Hal (2002) "Development of a Unique Gas Generator for a Non-Polluting Power Plant," California Energy Commission Feasibility Analysis, P500-02-011F, Mar. 2002, 42 pgs.
Ditaranto, et al. , (2006), "Combustion Instabilities in Sudden Expansion Oxy-Fuel Flames," *ScienceDirect, Combustion and Flame*, v. 146, Jun. 30, 2006, 15 pgs.
Foy, Kirsten et al. (2005) "Comparison of Ion Transport Membranes"—Fourth Annual Conference on Carbon Capture and Sequestration, DOE/NETL; May 2005, 11 pages.
Cho, J. H. et al. (2005) "Marrying LNG and Power Generation," *Energy Markets*; Oct./Nov. 2005; 10, 8; ABI/INFORM Trade & Industry, p. 28.
Ciulia, Vincent. About.com. Auto Repair. How the Engine Works. 2001-2003.
Corti, A. et al. (1988) "Athabasca Mineable Oil Sands: The RTR/Gulf Extraction Process Theoretical Model of Bitumen Detachment," 4th UNITAR/UNDP Int'l Conf. on Heavy Crude and Tar Sands Proceedings, v.5, paper No. 81, Edmonton, AB, Canada, Aug. 7-12, 1988, pp. 41-44.
Cryogenics. Science Clarified. 2012. http://www.scienceclarified.com/Co-Di/Cryogenics.html.
Defrate, L. A. et al. (1959) "Optimum Design of Ejector Using Digital Computers" Chem. Eng. Prog. Symp. Ser., 55 ( 21) pp. 46.
Elwell, L. C. et al. (2005) "Technical Overview of Carbon Dioxide Capture Technologies for Coal-Fired Power Plants," *MPR Associates, Inc.*, Jun. 22, 2005, 15 pgs.
Eriksson, Sara. Licentiate Thesis 2005, p. 22. KTH—"Development of Methane Oxidation Catalysts for Different Gas Turbine Combustor Concepts." The Royal Institute of Technology, Department of Chemical Engineering and Technology, Chemical Technology, Stockholm Sweden.
Ertesvag, I. S. et al. (2005) "Energy Analysis of a Gas-Turbine Combined-Cycle Power Plant With Precombustion $CO_2$ Capture," Elsivier, 2004, pp. 5-39.
Evulet, Andrei T. et al. "Application of Exhaust Gas Recirculation in a DLN F-Class Combustion System for Postcombustion Carbon Capture" ASME J. Engineering for Gas Turbines and Power, vol. 131, May 2009.
Evulet, Andrei T. et al. "On the Performance and Operability of GE's Dry Low Nox Combustors utilizing Exhaust Gas Recirculation for Post-Combustion Carbon Capture" Energy Procedia I 2009, 3809-3816.
http://www.turbineinletcooling.org/resources/papers/CTIC_WetCompression_Shepherd_ASMETurboExpo2011.pdf , Shepherd, IGTI 2011—CTIC Wet Compression, Jun. 8th, 2011.
Luby, P. et al. (2003) "Zero Carbon Power Generation: IGCC as the Premium Option," *Powergen International*, 19 pgs.
MacAdam, S. et al. (2008) "Coal-Based Oxy-Fuel System Evaluation and Combustor Development," *Clean Energy Systems, Inc.* 6 pgs.
Morehead, H. (2007) "Siemens Global Gasification and IGCC Update," *Siemens, Coal-Gen*, Aug. 3, 2007, 17 pgs.
Nanda, R. et al. (2007) "Utilizing Air Based Technologies as Heat Source for LNG Vaporization," presented at the 86th Annual convention of the *Gas Processors of America* (GPA 2007), Mar. 11-14, 2007, San Antonio, TX.
Reeves, S. R. (2001) "Geological Sequestration of $CO_2$ in Deep, Unmineable Coalbeds: An Integrated Research and Commercial-Scale Field Demonstration Project," *SPE 71749*, 10 pgs.
Reeves, S. R. (2003) "Enhanced Coalbed Methane Recovery," *SPE 101466-DL*, 8 pgs.
Richards, G. A. et al. (2001) "Advanced Steam Generators," *National Energy Technology Laboratory*, 7 pgs.
Rosetta, M. J. et al. (2006) "Integrating Ambient Air Vaporization Technology with Waste Heat Recovery—A Fresh Approach to LNG Vaporization," presented at the 85th annual convention of the *Gas Processors of America* (GPA 2006), Grapevine, Texas, Mar. 5-8, 2006.
Snarheim, D. et al. (2006) "Control Design for a Gas Turbine Cycle With $CO_2$ Capture Capabilities," *Modeling, Identification and Control*, vol. 00, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.
vanHemert, P. et al. (2006) "Adsorption of Carbon Dioxide and a Hydrogen-Carbon Dioxide Mixture," *Intn'l Coalbed Methane Symposium* (Tuscaloosa, AL) Paper 0615, 9 pgs.
Zhu, J. et al. (2002) "Recovery of Coalbed Methane by Gas Injection," *SPE 75255*, 15 pgs.
U.S. Appl. No. 13/596,684, filed Aug. 28, 2012, Slobodyanskiy et al.
U.S. Appl. No. 14/066,579, filed Oct. 29, 2013, Huntington et al.
U.S. Appl. No. 14/066,551, filed Oct. 29, 2013, Minto.
U.S. Appl. No. 14/144,511, filed Dec. 30, 2013, Thatcher et al.
U.S. Appl. No. 14/067,559, filed Oct. 30, 2013, Lucas John Stoia et al.
PCT/RU2013/000162, Feb. 28, 2013, General Electric Company.
U.S. Appl. No. 14/067,679, filed Oct. 30, 2013, Elizabeth Angelyn Fadde et al.
U.S. Appl. No. 14/067,714, filed Oct. 30, 2013, Carolyn Ashley Antoniono et al.
U.S. Appl. No. 14/067,726, filed Oct. 30, 2013, Carolyn Ashley Antoniono et al.
U.S. Appl. No. 14/067,731, filed Oct. 30, 2013, Carolyn Ashley Antoniono et al.
U.S. Appl. No. 14/067,739, filed Oct. 30, 2013, Carolyn Ashley Antoniono et al.
U.S. Appl. No. 14/067,797, filed Oct. 31, 2013, Anthony Wayne Krull et al.
U.S. Appl. No. 14/066,488, filed Oct. 29, 2013, Pramod K. Biyani et al.
U.S. Appl. No. 14/135,055, filed Dec. 19, 2013, Pramod K. Biyani et al.
U.S. Appl. No. 14/067,844, filed Oct. 30, 2013, John Farrior Woodall et al.
PCT/US13/036020, Apr. 10, 2013, General Electric Company/ExxonMobil Upstream Company.
U.S. Appl. No. 14/067,486, filed Oct. 30, 2013, Huntington et al.
U.S. Appl. No. 14/067,537, filed Oct. 30, 2013, Huntington et al.
U.S. Appl. No. 14/067,552, filed Oct. 30, 2013, Huntington et al.
U.S. Appl. No. 14/067,563, filed Oct. 30, 2013, Huntington et al.

\* cited by examiner

LOW EMISSION POWER GENERATION SYSTEMS AND METHODS INCORPORATING CARBON DIOXIDE SEPARATION

CROSS REFERENCE TO RELATED APPLICATIONS

This application is the National Stage entry under 35 U.S.C. 371 of PCT/US2012/027781, that published as WO 2012/128929 and was filed on 5 Mar. 2012 which claims the benefit of U.S. Provisional Application No. 61/542,041, filed on 30 Sep. 2011; U.S. Provisional Application 61/466,384 filed Mar. 22, 2011; U.S. Provisional Application 61/542,030 filed Sep. 30, 2011; U.S. Provisional Application 61/466,385 filed Mar. 22, 2011; U.S. Provisional Application 61/542,031 filed Sep. 30, 2011; U.S. Provisional Application 61/466,381 filed Mar. 22, 2011; and U.S. Provisional Application 61/542,035 filed Sep. 30, 2011, each of which is incorporated by reference, in its entirety, for all purposes.

This application contains subject matter related to U.S. Provisional Application 61/542,037 filed Sep. 30, 2011 (PCT/US2012/027776, that published as WO 2012/128927 and was filed on 5 Mar. 2012); U.S. Provisional Application 61/542,039 filed Sep. 30, 2011 (PCT/US2012/027780, that published as WO 2012/128928 and was filed on 5 Mar. 2012); and U.S. Provisional Application 61/542,036 filed Sep. 30, 2011 (PCT/US2012/027774, that published as WO 2012/128926 and was filed on 5 Mar. 2012).

FIELD OF THE DISCLOSURE

Embodiments of the disclosure relate to low emission power generation systems. More particularly, embodiments of the disclosure relate to methods and apparatus for combusting a fuel for power generation and enhanced carbon dioxide ($CO_2$) manufacture, and employing solvent technology to capture the $CO_2$.

BACKGROUND OF THE DISCLOSURE

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Many oil producing countries are experiencing strong domestic growth in power demand and have an interest in enhanced oil recovery (EOR) to improve oil recovery from their reservoirs. Two common EOR techniques include nitrogen ($N_2$) injection for reservoir pressure maintenance and carbon dioxide ($CO_2$) injection for miscible flooding for EOR. There is also a global concern regarding green house gas (GHG) emissions. This concern combined with the implementation of cap-and-trade policies in many countries makes reducing $CO_2$ emissions a priority for these and other countries as well as the companies that operate hydrocarbon production systems therein.

Some approaches to lower $CO_2$ emissions include fuel de-carbonization or post-combustion capture using solvents, such as amines. However, both of these solutions are expensive and reduce power generation efficiency, resulting in lower power production, increased fuel demand and increased cost of electricity to meet domestic power demand. In particular, the presence of oxygen, sulfur oxides ($SO_X$), and nitrogen oxide ($NO_X$) makes the use of amine solvent absorption very problematic. Another approach is an oxyfuel gas turbine in a combined cycle (e.g., where exhaust heat from the gas turbine Brayton cycle is captured to make steam and produce additional power in a Rankine cycle). However, there are no commercially available gas turbines that can operate in such a cycle and the power required to produce high purity oxygen significantly reduces the overall efficiency of the process.

Moreover, with the growing concern about global climate change and the impact of $CO_2$ emissions, emphasis has been placed on minimizing $CO_2$ emissions from power plants. Gas turbine power plants are efficient and have a lower cost compared to nuclear or coal power generation technologies. Capturing $CO_2$ from the exhaust of a gas turbine power plant is very expensive, however, because the concentration of $CO_2$ in the exhaust stack is low, a large volume of gas needs to be treated, and the pressure of the exhaust stream is low. These factors, among others, result in a high cost of $CO_2$ capture.

Capture and recovery of $CO_2$ from low emission power generation systems that incorporate an exhaust gas recycle loop has been previously described. For example, U.S. Patent Application Ser. No. 61/361,173, which is incorporated herein by reference in its entirety, illustrates the use of a potassium carbonate ($K_2CO_3$) solvent to absorb and recover $CO_2$ from such systems. When $CO_2$ is recovered via solvent absorption, however, the solvent also absorbs small quantities of volatile components (such as, for example, nitrogen, oxygen, argon, and carbon monoxide) that will have a small solubility in a water-based solvent such as $K_2CO_3$. Upon regeneration of the solvent to release the absorbed $CO_2$, these volatile components will also be evolved and will remain with the $CO_2$. If the $CO_2$ is used for EOR or is injected into a reservoir for sequestration, the presence of volatiles may be undesirable. For example, the presence of oxygen may increase corrosion rates, while the presence of carbon monoxide (CO) may result in safety or environmental hazards if released during startup or process upset conditions.

Accordingly, there is still a substantial need for a low emission, high efficiency power generation process with incorporated $CO_2$ capture and recovery at a reduced cost. Additionally, when a $K_2CO_3$ solvent is employed for $CO_2$ separation, there is also an interest in removing volatiles from the recovered $CO_2$.

SUMMARY OF THE DISCLOSURE

The present invention is directed to low emission power generation systems that incorporate an exhaust gas recycle loop and carbon dioxide ($CO_2$) capture and recovery using a potassium carbonate-based ($K_2CO_3$) separation system. In the low emission power generation systems described herein, exhaust gases from low emission gas turbines, which are vented in a typical natural gas combined cycle plant, are instead recycled and a portion of the recycled exhaust gas is separated and recovered. The apparatus, systems, and methods of the invention separate the exhaust gas using a $K_2CO_3$ solvent to absorb and recover $CO_2$. Such $K_2CO_3$ separation processes are sometimes referred to as hot potassium carbonate, or "hot pot" processes. Apparatus and methods for removing volatile components from the $CO_2$-rich solvent prior to regeneration of the solvent and removal of $CO_2$ are further incorporated herein, resulting in the production of high purity $CO_2$ with little to no contaminants. The recovered $CO_2$ may be used for enhanced oil recovery (EOR), sequestration, storage, or for a number of other purposes.

In the systems and methods of the present invention, fuel and a compressed oxidant are combusted in the presence of a compressed recycle stream in a combustion chamber to generate a discharge stream. The discharge stream is expanded to produce power and generate a gaseous exhaust stream, and the gaseous exhaust stream is cooled and recirculated to the main compressor. The main compressor generates a compressed recycle stream. A portion of the compressed recycle stream is directed back to the combustion chamber to act as a diluent during combustion, while the remainder of the compressed recycle stream is directed to a $CO_2$ separation system. Within the $CO_2$ separation system, the exhaust gases are cooled and directed to an absorption column, where a $K_2CO_3$ solvent is used to absorb $CO_2$ from the exhaust gases, generating a nitrogen-rich residual stream and a bicarbonate solvent solution.

In one or more embodiments of the invention, volatile components are removed from the bicarbonate solvent solution by stripping the solvent solution with a vapor such as nitrogen, argon, or steam. In other embodiments, volatile components are removed from the bicarbonate solvent solution by flashing the solvent solution to a pressure sufficient to release gaseous volatiles from the solvent while keeping the $CO_2$ in the liquid solution. The volatile components may then be recycled to the exhaust gas recirculation (EGR) system, such as by combining the volatiles with the cooled recycle stream entering the main compressor. In both scenarios, once volatiles have been removed from the bicarbonate solvent solution, the solution is flashed to atmospheric or near-atmospheric pressure and regenerated by boiling the bicarbonate solvent solution to remove $CO_2$ and water, producing a lean regenerated $K_2CO_3$ solvent. The regenerated solvent may be recycled to the absorption column, while the $CO_2$ and water removed from the solvent solution may be cooled and condensed to generate a water stream and a recovered $CO_2$ stream. By removing volatiles from the bicarbonate solvent solution before regenerating the solvent and recovering $CO_2$, a higher purity $CO_2$ product is obtained.

BRIEF DESCRIPTION OF THE DRAWINGS

The foregoing and other advantages of the present disclosure may become apparent upon reviewing the following detailed description and drawings of non-limiting examples of embodiments in which.

DETAILED DESCRIPTION OF THE DISCLOSURE

Figure 1:
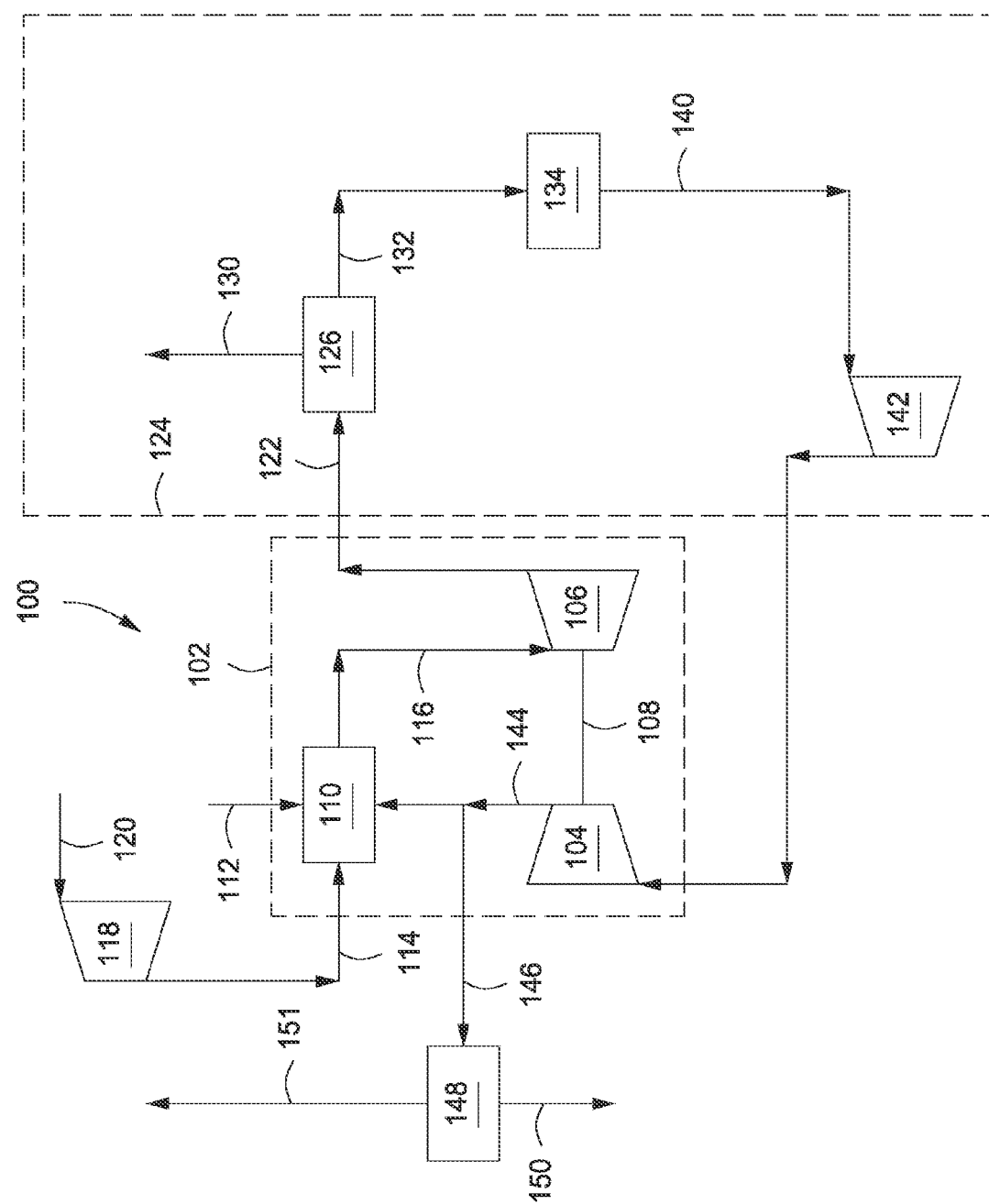
FIG. 1 depicts an integrated system for low emission power generation and enhanced $CO_2$ recovery.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

As used herein, the term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($CH_4$) as a major component, i.e. greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., hydrogen sulfide, carbon dioxide), or any combination thereof. The natural gas can also contain minor amounts of contaminants such as water, nitrogen, iron sulfide, wax, crude oil, or any combination thereof.

As used herein, the term "stoichiometric combustion" refers to a combustion reaction having a volume of reactants comprising a fuel and an oxidizer and a volume of products formed by combusting the reactants where the entire volume of the reactants is used to form the products. As used herein, the term "substantially stoichiometric combustion" refers to a combustion reaction having an equivalence ratio ranging from about 0.9:1 to about 1.1:1, or more preferably from about 0.95:1 to about 1.05:1.

As used herein, the term "stream" refers to a volume of fluids, although use of the term stream typically means a moving volume of fluids (e.g., having a velocity or mass flow rate). The term "stream," however, does not require a velocity, mass flow rate, or a particular type of conduit for enclosing the stream.

As used herein, the phrase "near-atmospheric pressure" refers to a pressure within about 10 percent, or preferably within about 5 percent, of the actual atmospheric pressure. For example, if atmospheric pressure is 14.7 psi, any pressure within the range of about 13.2 psi to about 16.2 psi is considered to be "near-atmospheric pressure."

Embodiments of the presently disclosed systems and processes may be used to produce ultra low emission electric power and $CO_2$ for EOR or sequestration applications. According to some embodiments disclosed herein, a mixture of air and fuel can be combusted and simultaneously mixed with a stream of recycled exhaust gas. The stream of recycled exhaust gas is cooled and compressed and may be used as a diluent to control or otherwise moderate the temperature of the combustion and of the exhaust gas entering the succeeding expander. In one or more embodiments, the combustion conditions are non-stoichiometric. In other embodiments, the combustion conditions are stoichiometric or substantially stoichiometric.

The exhaust gases not recycled to the combustion chamber are separated to capture $CO_2$ and generate a residual stream comprising nitrogen. In EOR applications, the recovered $CO_2$ is injected into or adjacent to producing oil wells, usually under supercritical conditions. The $CO_2$ acts as both a pressurizing agent and, when dissolved into the underground crude oil, significantly reduces the oil's viscosity enabling the oil to flow more rapidly through the earth to a removal well. The residual stream comprising nitrogen (and frequently oxygen and argon as well) may be used to generate additional power, and may also be used for a variety of purposes, including for pressure maintenance. In pressure maintenance applications, an inert gas such as nitrogen is compressed and injected into a hydrocarbon reservoir to maintain the original pressure in the reservoir, thus allowing for enhanced recovery of hydrocarbons. The result of the systems disclosed herein is the production of power and the concentration and capture of $CO_2$ in a more economically efficient manner.

Combustion at near stoichiometric conditions (or "slightly rich" combustion) can prove advantageous in order to eliminate the cost of excess oxygen removal. By cooling the exhaust gas and condensing the water out of the stream, a relatively high content $CO_2$ stream can be produced. While a portion of the recycled exhaust gas can be utilized for temperature moderation in the closed Brayton cycle, a remaining purge stream can be used for EOR applications and electric power can be produced with little or no $SO_X$, $NO_X$, or $CO_2$ being emitted to the atmosphere. The result of this process is the production of power and the manufacturing of additional $CO_2$.

Stoichiometric or substantially stoichiometric combustion of the fuel combined with a boost in the pressure of the exhaust gas prior to being compressed for recirculation can make the $CO_2$ partial pressure much higher than in conventional gas turbine exhaust. As a result, carbon capture in a $CO_2$ separation process can be undertaken using less energy-intensive solvents, such as potassium carbonate ($K_2CO_3$). The presence of oxygen ($O_2$), sulfur oxides ($SO_X$), and nitrogen oxides ($NO_X$) in the exhaust gas make the use of amine solvents (e.g., MEA, DEA, MDEA, and related solvents) difficult, even with the higher pressure and increased $CO_2$ content, since amine solvents can degrade in their presence. Moreover, $K_2CO_3$ easily absorbs $SO_X$ and $NO_X$, converting them to simple fertilizers such as potassium sulfite ($K_2SO_3$) and potassium nitrate ($KNO_3$). These fertilizers can be easily discharged in an environmentally harmless manner.

In one or more embodiments of the present invention, integrated power generation systems are provided comprising a gas turbine system, an exhaust gas recirculation system, and a $CO_2$ separation system. Various embodiments of each of these components are described in more detail below.

Gas Turbine System

The gas turbine system comprises a combustion chamber, an inlet compressor, and an expander, where the combustion chamber is configured to combust one or more compressed oxidants and one or more fuels in the presence of a compressed recycle stream to generate a discharge stream. The discharge stream is expanded in an expander to generate a gaseous exhaust stream. The one or more oxidants may comprise any oxygen-containing fluid, such as ambient air, oxygen-enriched air, substantially pure oxygen, or combinations thereof. The one or more fuels may comprise natural gas, associated gas, diesel, fuel oil, gasified coal, coke, naphtha, methane, ethane, butane, propane, syngas, kerosene, aviation fuel, bio-fuel, oxygenated hydrocarbon feedstock, other suitable hydrocarbon containing gases or liquids, hydrogen, carbon monoxide, or combinations thereof. Additionally, the fuel may comprise inert components including but not limited to $N_2$ or $CO_2$. In some embodiments, the fuel may be at least partially supplied by a hydrocarbon reservoir that is benefitting from EOR via injection of $CO_2$ captured using the process described herein. In certain embodiments, the fuel comprises natural gas.

In one or more embodiments, the combustion conditions in the combustion chamber are stoichiometric or substantially stoichiometric. A diluent may be supplied to the combustion chamber to control or otherwise regulate the temperature of the combustion and flue gas to meet the material requirements of the succeeding expander. The flow of the diluent may be adjusted to help maintain stoichiometric conditions in the combustion chamber, moderating changes in composition, volumetric flow, or other variations in the oxidant and fuel streams. In one or more embodiments, the diluent provided to the combustion chamber comprises at least a portion of the compressed recycle stream.

In some embodiments, high pressure steam may also be employed as a diluent in the combustion chamber. In such embodiments, the addition of steam would reduce power and size requirements in the system, but would require the addition of a water recycle loop.

Additionally, in further embodiments, the compressed oxidant feed to the combustion chamber may comprise argon. For example, the oxidant may comprise from about 0.1 to about 5.0 vol % argon, or from about 1.0 to about 4.5 vol % argon, or from about 2.0 to about 4.0 vol % argon, or from about 2.5 to about 3.5 vol % argon, or about 3.0 vol % argon.

The inlet compressor may be a single compressor or two or more compressors operating in parallel or in series. Each compressor may comprise a single stage or multiple stages. In multiple stage compressors, interstage cooling may optionally be employed to allow for higher overall compression ratios and higher overall power output. When more than one compressor is used to compress the oxidant stream, the compressors taken together are considered herein to be the "inlet compressor." The inlet compressor may be of any type suitable for the process described herein. Such compressors include, but are not limited to, axial, centrifugal, reciprocating, or twin-screw compressors and combinations thereof. In one or more embodiments, the inlet compressor comprises an axial compressor.

Combustion of the oxidant and fuel in the combustion chamber generates a discharge stream. The discharge stream comprises products of combustion, and their individual compositions will vary depending upon the composition of the fuel and the oxidant used in the combustion chamber. In one or more embodiments, the discharge stream may comprise vaporized water, $CO_2$, $O_2$, carbon monoxide (CO), nitrogen ($N_2$), argon (Ar), $NO_X$, $SO_X$, hydrogen sulfide ($H_2S$), or combinations thereof. The discharge stream may be expanded in the expander to form a gaseous exhaust stream.

The expander may be a single expander or two or more expanders operating in parallel or in series. Each expander may comprise a single stage or multiple stages. When more than one expander is used to expand the discharge stream, the expanders taken together are considered herein to be the "expander." The expander may be of any type suitable for the process described herein, including but not limited to axial or centrifugal expanders or combinations thereof. Expansion of the discharge stream generates power, which may be used to drive one or more compressors or electric generators. In one or more embodiments of the invention, the expander is coupled to the main compressor, described in further detail below, via a common shaft or other mechanical, electrical, or other power coupling, such that the main compressor is at least partially driven by the expander. In other embodiments, the main compressor may be mechanically coupled to an electric motor with or without a speed increasing or decreasing device such as a gear box. When taken together, the main compressor, combustion chamber, and expander may be characterized as a Brayton cycle.

Exhaust Gas Recirculation (EGR) System

The exhaust gas recirculation (EGR) system comprises a boost compressor or blower and one or more cooling units fluidly coupled to the boost compressor, where the boost compressor is configured to receive and increase the pressure of the gaseous exhaust stream and the one or more cooling units are configured to cool the gaseous exhaust stream and provide a cooled recycle stream to a main compressor. The main compressor compresses the cooled recycle stream and generates a compressed recycle stream. At least a portion of the compressed recycle stream is directed back to the combustion chamber, while a purge stream comprising another portion of the compressed recycle stream is cooled to generate a cooled purge stream that is directed to the $CO_2$ separation system.

The boost compressor (or blower) and the one or more cooling units may be arranged in any fashion suitable for the intended purpose. For example, the one or more cooling units may be located upstream or downstream of the boost compressor, or may be located both upstream and downstream of the boost compressor. The one or more cooling units may be any type of apparatus suitable for lowering the temperature of the exhaust gases, such as for example a heat recovery unit (HRU), heat exchanger, regenerator, direct contact cooler (DCC), trim cooler, mechanical refrigeration unit, or combinations thereof. In some embodiments, the cooling unit is an HRU, which may be located upstream of the boost compressor. When used, the HRU may be configured to receive the gaseous exhaust stream and utilize the residual heat in the stream to generate steam, such as in a heat recovery steam generator (HRSG). The steam generated by the HRSG may be used for a variety of purposes, such as to drive a steam turbine generator in a Rankine cycle or for water desalination. In the same or other embodiments, the cooling unit is a DCC, which may be located upstream or downstream of the boost compressor. When used, the DCC may be configured to remove a portion of condensed water from the cooled recycle stream via a water dropout stream. In some embodiments, the water dropout stream may optionally be routed to a HRSG to provide a water source for the generation of additional steam. In some embodiments, both a HRSG and a DCC are used to cool the gaseous exhaust stream and are each located upstream of the boost compressor.

In one or more embodiments, the cooled recycle stream is directed to the main compressor and compressed to generate a compressed recycle stream. The main compressor may be a single compressor or two or more compressors operating in parallel or in series. Each compressor may comprise a single stage or multiple stages. In multiple stage compressors, interstage cooling may optionally be employed to allow for higher overall compression ratios and higher overall power output. When more than one compressor is used to compress the cooled recycle stream, the compressors taken together are considered herein to be the "main compressor." The main compressor may be of any type suitable for the process described herein. Such compressors include, but are not limited to, axial, centrifugal, reciprocating, or twin-screw compressors and combinations thereof. In one or more embodiments, the main compressor comprises an axial compressor. Cooling and compressing the exhaust gases helps to address issues related to the large volume of gas that must be treated and the low pressure of the exhaust streams that ordinarily lead to a high cost of $CO_2$ capture, thus making $CO_2$ capture and recovery in the present systems more efficient and more cost effective.

Upon exiting the main compressor, the compressed recycle stream may be directed to the combustion chamber for use as a diluent to control or otherwise regulate the temperature of the combustion and flue gas to meet the material requirements of the succeeding expander and, when desired, to maintain stoichiometric combustion conditions in the combustion chamber. In one or more embodiments, a purge stream may be diverted from the compressed recycle stream and directed to a $CO_2$ separation system. It will be recognized by those skilled in the art that intermediate heating, cooling, or other process operations may be required so that the purge stream enters the $CO_2$ separation system at conditions optimized for the particular separation process employed. In one or more embodiments, for example, a heat exchanger or other cooling unit may be used to cool the purge stream to generate a cooled purge stream that is directed to the $CO_2$ separation system. The heat exchanger may employ any cooling fluid suitable to effect the desired amount of cooling, including but not limited to seawater, chilled water, one or more refrigerants, other process streams, or combinations thereof. In some embodiments, the purge stream may be cooled in a cross exchanger configured to use the nitrogen-rich residual stream exiting the absorption column of the $CO_2$ separation system for cooling. In embodiments in which the residual stream is later expanded to generate power, cross exchanging the purge and residual streams may be especially advantageous because the additional heat provided to the residual stream may allow for increased power generation.

Carbon Dioxide Separation System

The combination of stoichiometric combustion (when used) in the combustion chamber and water removal through the one or more cooling units allows the $CO_2$ content in the exhaust gas to accumulate to about 10 vol % or higher, which is higher than exhaust gases in conventional combined-cycle systems. These effects, plus the impact of higher pressures resulting from the implementation and of a boost compressor, make the $CO_2$ partial pressure much higher than conventional gas turbine exhaust. Consequently, this allows for carbon capture in the $CO_2$ separation system using less energy-intensive solvents, such as $K_2CO_3$ solvent technology.

The presence of $O_2$, $SO_X$, and $NO_X$ make the use of amine solvents (e.g., MEA, DEA, MDEA, and related solvents) difficult, even with higher pressure and increased $CO_2$ content, since these gases can cause amine degradation. Potassium carbonate, however, is non-reactive and immune to any effects of oxygen. Although the reaction undertaken in the combustion chamber may, in some embodiments, be stoichiometric, a fraction of $O_2$ may nonetheless be present in the cooled purge stream due to combustion equilibrium limitations. While MEA solvents will require significant solvent reclamation and safe disposal, the use of $K_2CO_3$ eliminates oxygen-based solvent degradation.

Potassium carbonate easily absorbs $SO_X$ or $NO_X$ in the exhaust gas, converting these compounds to simple fertilizers, such as potassium sulfite ($K_2SO_3$) and potassium nitrate ($KNO_3$). In particular, $SO_2$, $SO_3$, and $NO_2$ all form fairly strong acids in water, much stronger than $CO_2$. Thus, they will be preferentially absorbed in the solvent solution, but will become heat stable salts (HSS) and will not be removed by regeneration. On the other hand, NO and $N_2O$ have low solubility and are more difficult to absorb than $NO_2$, and tend to occur at lower concentrations. As simple fertilizers, the $K_2SO_3$ and $KNO_3$ can be easily discharged in an environmentally harmless manner, so long as no other toxic compounds, such as corrosion inhibitors, activators, etc., are added to the solvent system. When the sulfate and nitrate compounds are removed, potassium hydroxide (KOH) can be added for solvent makeup. Since potassium hydroxide is a fairly inexpensive chemical, this can be accomplished rather economically.

Accordingly, in one or more embodiments, the $CO_2$ separation system comprises an absorption column configured to absorb $CO_2$ from the cooled purge stream using a $K_2CO_3$ solvent. As $CO_2$ is absorbed by the $K_2CO_3$ in the absorption column, it reacts with water to form carbonic acid ($H_2CO_3$), and then bicarbonate ($HCO_3$). The acidic part of the carbonic acid ($H^+$) can react with the carbonate ion ($CO_3^{-2}$) to form an additional bicarbonate ion. Thus, the overall reaction can be as follows:

$$CO_2 + H_2O + K_2CO_3 \leftrightarrow 2KHCO_3$$

As a result, the absorption column generates a nitrogen-rich residual stream and a bicarbonate solvent solution as described above.

The nitrogen-rich residual stream from the absorption column may be used, wholly or in part, for a variety of applications. For example, the residual stream may be injected into a hydrocarbon reservoir for pressure maintenance. The residual stream may also be sold, stored, or vented. In one or more embodiments when pressure maintenance is not a viable option (or when only a portion of the residual stream is required for pressure maintenance), the residual stream may be cooled, by expansion or another method, and used to provide refrigeration in the systems described herein. For example, the cooled residual stream may be used to provide refrigeration to reduce the suction temperature of one or more compressors within the system, or to chill water for use in one or more cooling units within the system.

In other embodiments when all or part of the residual stream is not used for pressure maintenance, the residual stream may instead be heated prior to expansion in a turbine so that additional power may be generated for use elsewhere in the system or for sale. Some methods of heating the residual stream include cross-exchanging the residual stream with another process stream (such as the purge stream, as described above, or another stream within the separation system or in the overall power generation system) in a heat exchanger or using a supplementary combustor to supply additional heat to the residual stream. It will be appreciated that the use of an additional combustor will require additional fuel. If a carbon-containing fuel is used in the combustor, additional $CO_2$ will be generated that will be unrecoverable from the residual stream. Therefore, in some embodiments, the fuel used in the combustor may be a non-carbon fuel source, such as hydrogen. The oxidant required by the supplementary combustor may be supplied via a separate oxidant stream, or there may be sufficient oxidant in the residual stream such that an additional supply of oxidant is unnecessary. Other possible methods for heating the absorption column residual stream include using a heating coil in a HRSG to heat the residual stream, using catalysis to combust any CO present in the residual stream, or heating the stream as a consequence of using the residual stream for cooling (i.e., as the residual stream provides cooling to other streams or apparatus, the stream itself is heated).

In one or more embodiments, the bicarbonate solvent solution exiting the absorption column is flashed to near-atmospheric pressure via a valve or other pressure-reducing device. In some embodiments, the pressure-reducing device may be a hydraulic turbine configured to generate additional power. Once flashed to near-atmospheric pressure, the bicarbonate solvent solution may be boiled in a regeneration column to remove $CO_2$ and water, producing a regenerated potassium carbonate solvent that may be recycled to the absorption column.

In some embodiments, the regeneration column may operate at temperatures exceeding the boiling point of water. For example, the regeneration column can operate in a temperature range from a lower limit of about 220° F., or about 230° F., or about 240° F., to an upper limit of about 280° F., about 290° F., or about 300° F. In the same or other embodiments, the regeneration column can operate at pressures ranging from about 0 psig to about 10 psig. In at least one embodiment, the regeneration column can be configured to operate at a pressure of about 3 psig.

The regeneration column can be configured to use steam circulating therein to boil the bicarbonate solvent and reverse the reaction undertaken in the absorption column, thereby yielding a regenerated, lean potassium carbonate solvent suitable for recirculation to the absorption column. In at least one embodiment, an in-line pump or the like may be used to drive at least a portion of the lean potassium carbonate solvent back to the absorption column.

In one or more embodiments, a portion of the lean potassium carbonate solvent recirculated to the absorption column may optionally be removed as a heat stable salt (HSS). Illustrative HSSs can include compound fertilizers, including but not limited to potassium sulfite and/or potassium nitrate. In order to make up for the loss of potassium carbonate content when an HHS is removed, and to maintain overall solution strength, a stream of potassium hydroxide can be subsequently supplied to the lean potassium carbonate stream being directed to the absorption column or to the absorption column itself. In one or more embodiments, the potassium hydroxide serves as a solvent makeup.

The lean potassium carbonate solvent directed to the absorption column may optionally be directed through a first cooling unit before entering the absorption column. In one or more embodiments, the first cooling unit can be, for example, an air cooler or radiator-type heat exchanger, configured to reduce the temperature of the solvent. If used, the first cooling unit can be configured to reduce the temperature of the lean potassium carbonate solvent to temperatures ranging from about 230° F. to about 60° F.

In order to generate the steam circulating in the regeneration column and maintain the required heat of regeneration, in one or more embodiments the regeneration column further comprises a reboiler fluidly coupled to the regeneration column. The reboiler can be configured to heat at least a portion of the lean potassium carbonate solvent not recirculated to the absorption column to produce a heated lean potassium carbonate solvent. The heated lean potassium carbonate solvent may then be recycled to the regeneration column to produce steam for boiling the bicarbonate solvent solution. In at least one embodiment, the reboiler can be supplied with heat from the HRSG in the EGR system. In other embodiments, however, the reboiler can be supplied with heat from another source, such as from the intermediate extraction or discharge of a steam turbine.

The water included in the cooled purge stream can condense into the bicarbonate solvent solution in the absorption column and subsequently boil out in the regeneration column. Consequently, the regeneration column can further discharge the $CO_2$ separated from the solvent during the regeneration process and any residual water via an overhead stream. In at least one embodiment, the $CO_2$ (which is typically a vapor) and residual water can be directed through a second cooling unit, such as an air cooler or radiator-type heat exchanger, before being introduced to a condenser or other separation vessel. The condenser can be configured to separate the residual water from any recovered $CO_2$ to generate a water stream and a stream comprising primarily $CO_2$.

In some embodiments, at least a portion of the water exiting the condenser may be recirculated back into the regeneration column to allow the balance of water in the system to be maintained. Water is constantly introduced into the solvent via the cooled purge stream, and subsequently removed via the condenser. In order to maintain solvent conditions and strength, the water must remain in balance within the $CO_2$ separation system. Accordingly, the water recirculated to the regeneration column can allow water to be returned so that steam generated by the reboiler can be controlled independently of this water balance. In other words, the recirculated water can be used as feedwater for the generation of steam in the regeneration column or to raise low pressure steam from feed cooling. In the same or other embodiments, a portion of the water exiting the condenser can be disposed of as fresh process water. For example, although it may in some embodiments contain a portion of dissolved $CO_2$, the water exiting the condenser can be used for irrigation water, treated to be used for boiler feed water, and/or uses as clean process water.

In some embodiments, the separated $CO_2$ exiting the condenser can be subsequently compressed for applications such as $CO_2$ sequestration or storage, enhanced oil recovery, $CO_2$ sales, carbon capture, and/or combinations thereof. In one or more embodiments, the $CO_2$ stream exiting the condenser is of high purity, and comprises at least 95 mol % $CO_2$, or at least 98 mol % $CO_2$, or at least 99 mol % $CO_2$, or at least 99.5 mol % $CO_2$.

Removal of Volatile Components

When $CO_2$ is recovered via solvent absorption as described herein, the solvent may also absorb small quantities of volatile components (such as, for example, $N_2$, $O_2$, Ar, and CO) that will have a small solubility in a water-based solvent such as $K_2CO_3$. Upon regeneration of the solvent to release the absorbed $CO_2$, these volatile components are also evolved and remain with the $CO_2$. In certain situations, such as when the $CO_2$ is used for EOR or is injected into a reservoir for sequestration, the presence of volatiles may be undesirable. For example, the presence of oxygen may increase corrosion rates, while the presence of CO may result in safety or environmental hazards if the $CO_2$ were released during startup or process upset conditions.

Accordingly, in certain embodiments of the present invention, the rich bicarbonate solvent solution exiting the absorption column is treated at an elevated pressure or intermediate pressure to remove volatile components before the solution is flashed to near-atmospheric pressure and regenerated in the regeneration column. The volatile components removed may include, but are not limited to, $O_2$, $N_2$, Ar, and CO. Two methods for removing volatiles, stripping with vapor and two-stage flashing, are described herein. It will be appreciated by those skilled in the art that variations on these methods may also be effective for removing volatiles from the bicarbonate solvent solution, and any such methods designed to remove volatiles from the solution without also removing $CO_2$ (or while removing only a negligible amount of $CO_2$) are considered to be within the scope of the present invention.

Vapor Stripping

In one or more embodiments of the present invention, volatiles are removed from the rich bicarbonate solvent solution by stripping the solvent with a vapor in a stripping column or stripping section. The vapor may be any (preferably clean) vapor that does not interact with the $CO_2$ in the solvent solution. Suitable vapors may include, but are not limited to, nitrogen, argon, steam, and combinations thereof.

In one or more embodiments, a stripping section is incorporated as additional stages within the absorption column (generally at the bottom of the column), such that the vapor stream enters the absorption column at or near the bottom stage of the column, while the cooled purge stream is fed to the middle of the column just above the stripping stages. The rich bicarbonate solvent solution, having been stripped of volatiles, exits the bottom of the absorption column, while the stripping vapor (comprising the volatiles removed from the solvent) continues up the absorption column and exits the column as part of the nitrogen-rich residual stream.

In other embodiments, the stripping section may be an additional column separate from the absorption column. In such embodiments, a vapor stream is fed to or near the bottom of the stripping column, and rich bicarbonate solvent exiting the absorption column is fed to or near the top of the stripping column. In this manner, the vapor and the bicarbonate solvent solution flow countercurrently through the stripping column. The stripping column therefore generates a first (or overhead) stream comprising the stripping vapor and the volatiles removed from the bicarbonate solvent solution and a second (or bottom) stream comprising bicarbonate solvent solution that has been stripped of volatiles. The overhead stream may be recycled to the absorption column, such that the stripping vapor (comprising the volatiles removed from the solvent) exits the absorption column as part of the nitrogen-rich residual stream.

In either scenario, stripping of the bicarbonate solvent solution takes place at an elevated pressure generally at or near the pressure of the cooled purge stream entering the absorption column. By stripping the rich bicarbonate solvent at an elevated pressure, volatiles are removed from the solvent solution while essentially all of the $CO_2$ remains in the bicarbonate solution stream exiting the stripping section or column. The bicarbonate solvent solution may then be flashed via a valve or other pressure-reducing device (such as a hydraulic turbine) to near-atmospheric pressure and directed to the regeneration column. By removing the volatiles in this manner (i.e., prior to flashing the solvent solution to near-atmospheric pressure and regenerating the solvent), a pure or nearly pure $CO_2$ stream may be recovered from the $CO_2$ separation system.

As described above, when a stripping section or column is employed, the stripping vapors will exit the absorption column in the nitrogen-rich residual stream. It will be appreciated that further processing of this stream may be required to account for the vapors present in the stream. Additionally, in embodiments in which the nitrogen-rich residual stream is expanded to generate power, it may be desirable to pass the residual stream over an oxidizing catalyst so that no CO is emitted when or if the residual stream is later vented. Excess oxygen may be added to the stream prior to entering the oxidizing catalyst to ensure full combustion of any CO. Such combustion will advantageously further heat the residual stream, thus allowing for increased power generation.

Two-Stage Flash

In one or more other embodiments, instead of using a stripping column or section to remove volatiles, the rich bicarbonate solvent solution exiting the absorption column may instead be flashed via a valve or other pressure-reducing device to an intermediate (or reduced) pressure between the pressure of the cooled purge stream and atmospheric pressure. By flashing to a reduced but still elevated pressure, the bicarbonate solvent solution becomes a dual-phase stream comprising a gaseous phase and a liquid phase. In one or more embodiments, the reduced pressure to which the solvent is flashed is selected so that the gaseous phase comprises the volatile components in the solution (such as nitrogen, oxygen, argon, carbon monoxide, and combinations thereof), while essentially all of the $CO_2$ remains in the liquid phase of the solution. In some embodiments, for example, the gaseous phase of the bicarbonate solvent solution comprises less than about 5 mol %, or less than about 3 mol %, or less than about 2 mol %, or less than about 1 mol %, or less than about 0.5 mol %, or less than about 0.1 mol % $CO_2$.

In certain embodiments, the dual-phase solvent solution may be directed to a flash vessel or other separation device configured to separate the gaseous volatiles from the liquid bicarbonate solvent solution comprising the $CO_2$. In some embodiments, at least about 95 mol %, or at least about 97 mol %, or at least about 98 mol %, or at least about 99 mol % of the total $CO_2$ entering the flash vessel remains in solution and is removed with the liquid bicarbonate solvent solution from the flash vessel. The volatiles exiting the flash vessel may then be recycled to the exhaust gas recirculation system. For example, the volatiles may be recycled and combined with the cooled recycle stream upstream of the main compressor. By recycling the volatiles in this manner, CO and $O_2$ may be re-used for combustion, thus increasing the efficiency of the power generation system. Additionally, if any $CO_2$ is removed with the volatiles, it is recompressed and reprocessed through the $CO_2$ separation system for recovery.

In one or more embodiments, the bicarbonate solvent solution exiting the flash vessel may be flashed via a second valve or other pressure-reducing device to near-atmospheric pressure and directed to the regeneration column. By removing the volatiles in this manner (i.e., at an intermediate pressure and prior to flashing the solvent solution to near-atmospheric pressure and regenerating the solvent), a pure or nearly pure $CO_2$ stream may be recovered from the $CO_2$ separation system.

As may be appreciated by those skilled in the art, selection of the method and apparatus used to remove volatiles from the rich bicarbonate solvent solution may be influenced by a variety of factors. For example, the intended use of the nitrogen-rich residual stream exiting the absorption column may help determine which of the volatiles removal methods is preferred. As described previously, the use of vapor stripping to remove volatiles may be advantageous in embodiments where the nitrogen-rich residual stream is expanded to generate power, particularly when the residual stream is passed over an oxidizing catalyst to combust CO. Such combustion will further heat the residual stream, thus allowing for increased power generation. Alternatively, when the nitrogen-rich residual stream is used for pressure maintenance in hydrocarbon reservoirs, removal of volatiles via the two-stage flash described above may be preferred. By recycling the volatiles removed from the bicarbonate solvent to the EGR in the two-stage flash method rather than combining the volatiles with the residual stream (as in the vapor stripping method), fuel efficiency is maximized because all of the fuel and/or oxidant value in the volatiles is recycled and recovered.

Figure 2:
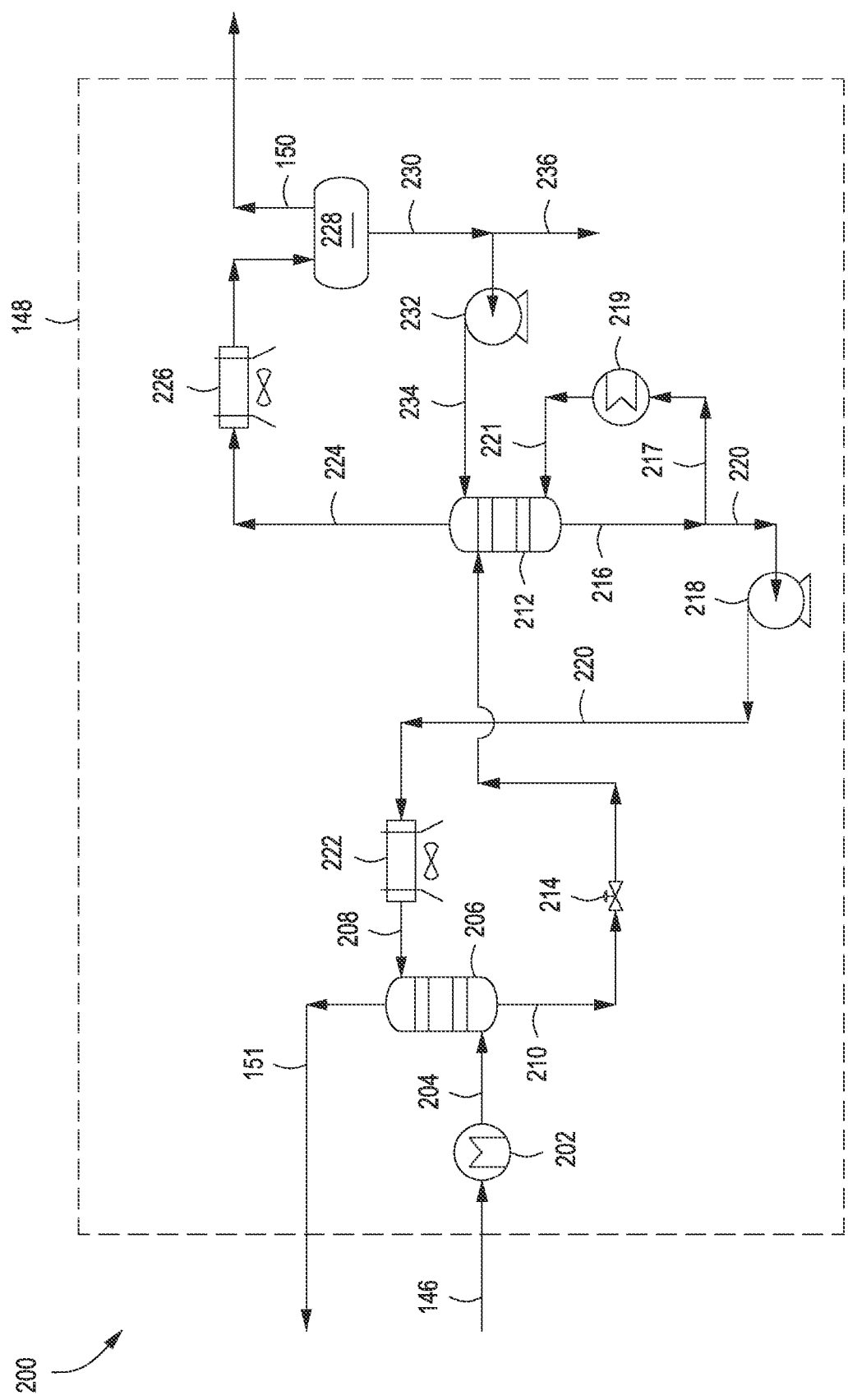
FIG. 2 depicts an illustrative $CO_2$ capture system used in an integrated system for low emission power generation and enhanced $CO_2$ recovery.

Referring now to the figures, embodiments of the invention may be best understood with reference to a base case, depicted in FIGS. 1 and 2. FIG. 1 depicts a schematic of an illustrative integrated system 100 for power generation and $CO_2$ recovery. In at least one embodiment, the power generation system 100 can include a gas turbine system 102 characterized as a power-producing, closed Brayton cycle. The gas turbine system 102 can have a first or main compressor 104 coupled to an expander 106 via a shaft 108. The shaft 108 can be any mechanical, electrical, or other power coupling, thereby allowing a portion of the mechanical energy generated by the expander 106 to drive the main compressor 104. In at least one embodiment, the gas turbine system 102 can be a standard gas turbine, where the main compressor 104 and expander 106 form the compressor and expander ends, respectively. In other embodiments, however, the main compressor 104 and expander 106 can be individualized components in the system 102.

The gas turbine system 102 can also include a combustion chamber 110 configured to combust a fuel in line 112 mixed with a compressed oxidant in line 114. In one or more embodiments, the fuel in line 112 can include any suitable hydrocarbon gas or liquid, such as natural gas, methane, ethane, naphtha, butane, propane, syngas, diesel, kerosene, aviation fuel, coal derived fuel, bio-fuel, oxygenated hydrocarbon feedstock, hydrogen, carbon monoxide, or combinations thereof. The compressed oxidant in line 114 can be derived from a second or inlet compressor 118 fluidly coupled to the combustion chamber 110 and adapted to compress a feed oxidant 120. In one or more embodiments, the feed oxidant 120 can include any suitable gas containing oxygen, such as air, oxygen, oxygen-rich air, or combinations thereof.

As will be described in more detail below, the combustion chamber 110 can also receive a compressed recycle stream 144, including an exhaust gas primarily having $CO_2$ and nitrogen components. The compressed recycle stream 144 can be derived from the main compressor 104 and may in some embodiments be adapted to help facilitate the stoichiometric or substantially stoichiometric combustion of the compressed oxidant in line 114 and fuel in line 112, and also to increase the $CO_2$ concentration in the exhaust gas. An exhaust gas in line 116 can be generated as a product of combustion of the fuel in line 112 and the compressed oxidant in line 114, in the presence of the compressed recycle stream 144. In at least one embodiment, the fuel in line 112 can be primarily natural gas, thereby generating an exhaust gas in line 116 including volumetric portions of vaporized water, $CO_2$, nitrogen, nitrogen oxides ($NO_X$), and sulfur oxides ($SO_X$). In some embodiments, a small portion of unburned fuel or other compounds may also be present in the exhaust gas in line 116 due to combustion equilibrium limitations. The exhaust gas in line 116 can be directed to the inlet of the expander 106. As the exhaust gas in line 116 expands through the expander 106, it generates mechanical power to drive the main compressor 104 and also produce a gaseous exhaust in line 122 having a heightened $CO_2$ content resulting from the influx of the compressed recycle exhaust gas in line 144.

The power generation system 100 can also include an exhaust gas recirculation (EGR) system 124. In one or more embodiments, the EGR system 124 can include a heat recovery steam generator (HRSG) 126, or similar device. The gaseous exhaust in line 122 can be sent to the HRSG 126 in order to generate steam in line 130 and a cooled exhaust gas in line 132. In some embodiments, the steam in line 130 can be sent to a steam turbine (not shown) to generate additional electrical power or to the $CO_2$ separator 148 to provide reboiler heat. In such embodiments, the combination of the HRSG 126 and the steam turbine can be characterized as a Rankine cycle. In combination with the gas turbine system 102, the HRSG 126 and the steam turbine, when included, can form part of a combined-cycle power generating plant, such as a natural gas combined-cycle (NGCC) plant.

The cooled exhaust gas in line 132 can be sent to at least one cooling unit 134 configured to reduce the temperature of the cooled exhaust gas in line 132 and generate a cooled recycle gas stream 140. In one or more embodiments, the cooling unit 134 can be a direct contact cooler, trim cooler, a mechanical refrigeration unit, or combinations thereof. The cooling unit 134 can also be configured to remove a portion of condensed water via a water dropout stream (not shown) which can, in at least one embodiment, be routed to the HRSG 126 to provide a water source for the generation of additional steam in line 130. In one or more embodiments, the cooled recycle gas stream 140 can be directed to a boost compressor 142 fluidly coupled to the cooling unit 134. Cooling the cooled exhaust gas in line 132 in the cooling unit 134 can reduce the power required to compress the cooled recycle gas stream 140 in the boost compressor 142.

The boost compressor 142 can be configured to increase the pressure of the cooled recycle gas stream 140 before it is introduced into the main compressor 104. As opposed to a conventional fan or blower system, the boost compressor 142 increases the overall density of the cooled recycle gas stream 140, thereby directing an increased mass flow rate for the same volumetric flow to the main compressor 104. Because the main compressor 104 is typically volume-flow limited, directing more mass flow through the main compressor 104 can result in a higher discharge pressure from the main compressor 104, thereby translating into a higher pressure ratio across the expander 106. A higher pressure ratio generated across the expander 106 can allow for higher inlet temperatures and, therefore, an increase in power and efficiency of expander 106. This can prove advantageous since the $CO_2$-rich exhaust gas in line 116 generally maintains a higher specific heat capacity.

The main compressor 104 can be configured to compress the cooled recycle gas stream 140 received from the boost compressor 142 to a pressure nominally above the combustion chamber 110 pressure, thereby generating the compressed recycle stream 144. In at least one embodiment, a purge stream 146 can be diverted from the compressed recycle stream 144 and subsequently treated in a $CO_2$ separator 148 to capture $CO_2$ via line 150. The separated $CO_2$ in line 150 can be used for sales, used in another process requiring carbon dioxide, and/or compressed and injected into a terrestrial reservoir for enhanced oil recovery (EOR), sequestration, or another purpose.

A residual stream 151, essentially depleted of $CO_2$ and consisting primarily of nitrogen, can be derived from the $CO_2$ separator 148. In one or more embodiments, the residual stream 151 can be expanded in a gas expander (not shown), such as a power-producing nitrogen expander fluidly coupled to the $CO_2$ separator 148. In such embodiments, the gas expander can be optionally coupled to the inlet compressor 118 through a common shaft or other mechanical, electrical, or other power coupling, thereby allowing a portion of the power generated by the gas expander to drive the inlet compressor 118. The residual stream 151, whether expanded as described herein or not, can be vented to the atmosphere or implemented into other downstream applications known in the art. For example, the expanded nitrogen stream can be used in an evaporative cooling process configured to further reduce the temperature of the exhaust gas. In one or more embodiments, the exhaust gas in line 151 can be suitable for injection into a reservoir for pressure maintenance applications. In applications where methane gas is typically reinjected into hydrocarbon wells to maintain well pressures, compressing the residual stream 151 may prove advantageous. For example, pressurized nitrogen gas from line 151 can instead be injected into the hydrocarbon wells and any residual methane gas can be sold or otherwise used as a fuel in related applications, such as providing fuel in line 112.

The combustion in combustion chamber 110 may take place under stoichiometric or non-stoichiometric conditions. In some embodiments, stoichiometric or substantially stoichiometric combustion conditions may be desired. For example, the EGR system 124 as described herein, especially with the addition of the boost compressor 142, can be implemented to achieve a higher concentration of $CO_2$ in the exhaust gas of the power generation system 100, thereby allowing for more effective $CO_2$ separation for subsequent sequestration, pressure maintenance, or EOR applications. In certain embodiments disclosed herein, the concentration of $CO_2$ in the exhaust gas stream can be effectively increased to about 10 vol % or higher. To accomplish this, the combustion chamber 110 can be adapted to stoichiometrically combust the incoming mixture of fuel in line 112 and compressed oxidant in line 114. In order to moderate the temperature of the stoichiometric combustion to meet expander 106 inlet temperature and component cooling requirements, a portion of the compressed recycle stream 144 can be simultaneously injected into the combustion chamber 110 as a diluent. Thus, embodiments of the disclosure may reduce or essentially eliminate any excess oxygen from the exhaust gas while simultaneously increasing its $CO_2$ composition. As such, the gaseous exhaust in line 122 can have less than about 3.0 vol % oxygen, or less than about 1.0 vol % oxygen, or less than about 0.1 vol % oxygen, or even less than about 0.001 vol % oxygen.

Referring now to FIG. 2, depicted is a $CO_2$ separation system 200 that can employ potassium carbonate ($K_2CO_3$) solvent technology as described herein. The $CO_2$ separation system 200 can be or form at least a portion of the $CO_2$ separator 148, as generally described herein with reference to FIG. 1. In one or more embodiments, the system 200 can be configured to receive the purge stream 146 tapped from the compressed recycle stream 144 (FIG. 1) at a temperature of around 800° F. and a pressures of around 270 psia to about 280 psia.

The purge stream 146, containing primarily nitrogen, $CO_2$, and excess combustion water, can be cooled in a heat exchanger 202, thereby generating a cooled purge stream in line 204. In an embodiment, the heat exchanger 202 can generate steam, which may in some cases be integrated with the steam stream 130 from the HRSG 126 (FIG. 1). Extracting $CO_2$ from the purge stream 146 in the $CO_2$ separation system 200 generates a nitrogen-rich residual stream 151 at or near the elevated pressure of the purge stream 146. In at least one embodiment, the heat exchanger 202 can be a cross exchanger fluidly coupled to the residual stream 151 and configured to extract the heat energy associated with cooling the purge stream 146 in order to re-heat the residual stream 151. Once reheated, the residual stream 151 can be subsequently expanded to generate mechanical power, as generally described above.

The cooled purge stream in line 204 can be directed to an absorption column 206 where a solvent from line 208 is circulated, and the residual stream 151 is simultaneously discharged overhead for further downstream processing. In one or more embodiments, the solvent is a water-based salt solution of $K_2CO_3$. When compared to competing solvents, such as MEA, the $K_2CO_3$ solvent is quite temperature-tolerant. As a result, the cooling of the purge stream 146 can be minimized, as needed, and a higher temperature purge stream 146 can be allowed to enter the absorption column 206 without raising thermal degradation concerns. Accordingly, the degree of cooling of the purge stream 146 can be modified to match process heat requirements, rather than cooling to avoid thermal degradation.

As a result of the absorption of $CO_2$ by the potassium carbonate solvent in the absorption column 206, a rich bicarbonate solvent can be discharged from the bottom of the absorption column 206 via line 210 and directed to a regeneration column 212. In one embodiment, a first or intermediate valve 214 disposed in the line 210 can be configured to flash the bicarbonate solvent to a lower, near-atmospheric pressure before introduction to the regeneration column 212. In at least one embodiment, the first valve 214 can be a hydraulic turbine configured to generate extra power.

The regeneration column 212 can be configured to use steam circulating therein to boil the bicarbonate solvent and reverse the reaction undertaken in the absorption column 206, thereby yielding a regenerated, lean potassium carbonate solvent suitable for recirculation via line 216 below. In at least one embodiment, an in-line pump 218, or the like, can drive at least a portion of the lean potassium carbonate solvent via line 220 back to the absorption column 206.

The lean potassium carbonate solvent in line 220 can then be optionally directed through a first cooling unit 222. In one or more embodiments, the first cooling unit 222 can be, for example, an air cooler or radiator-type heat exchanger, configured to reduce the temperature of the solvent.

In order to generate the steam circulating in the regeneration column 212 and maintain the required heat of regeneration, at least a portion of the lean potassium carbonate solvent in line 216 can be directed to a reboiler 219 via line 217. The reboiler 219 can be configured to increase the temperature of the lean potassium carbonate solvent in line 217, and return a heated regenerated potassium carbonate solvent back to the regeneration column via line 221. In at least one embodiment, the reboiler 219 can be supplied with heat from the HRSG 126 (FIG. 1). In other embodiments, however, the reboiler 219 can be supplied with heat from the discharge of a backpressure type steam turbine, or from an extraction sidestream from a condensing type steam turbine.

The water included in the purge stream 146 can condense into the solvent solution in the absorption column 206, and subsequently boil out in the regeneration column 212. Consequently, the regeneration column 212 can further discharge $CO_2$ vapor and any residual water via overhead line 224. In at least one embodiment, the $CO_2$ vapor and residual water can be directed through a second cooling unit 226, such as an air cooler or radiator-type heat exchanger, before being introduced into a condenser 228. The condenser 228 can be configured to separate the residual water from any recovered $CO_2$ and direct the separated water into line 230 below while feeding the recovered $CO_2$ into line 150 overhead. As can be appreciated, line 150 can be the same line 150 as described above with reference to FIG. 1. In at least one embodiment, the separated $CO_2$ in line 150 can be subsequently compressed for applications such as $CO_2$ sequestration, enhanced oil recovery, $CO_2$ sales, carbon capture, and/or combinations thereof.

In one embodiment, at least a portion of the separated water in line 230 can be recirculated back into the regeneration column 212 via line 234 using a pump 232 to allow the balance of water in the system to be maintained. Water is constantly introduced into the solvent via stream 204, and subsequently removed via lines 236, 150, and 151. In order to maintain solvent conditions and strength, the water must remain in balance within the system 200. Accordingly, the water recirculated in line 234 can allow water to be returned so that steam raised in line 221 can be controlled independently of this water balance. In other embodiments, a portion of the residual water in line 230 can be disposed of as fresh process water via line 236. For example, the water in line 236 can be used for irrigation water, treated to be used for boiler feed water, and/or other process water.

Figure 3:
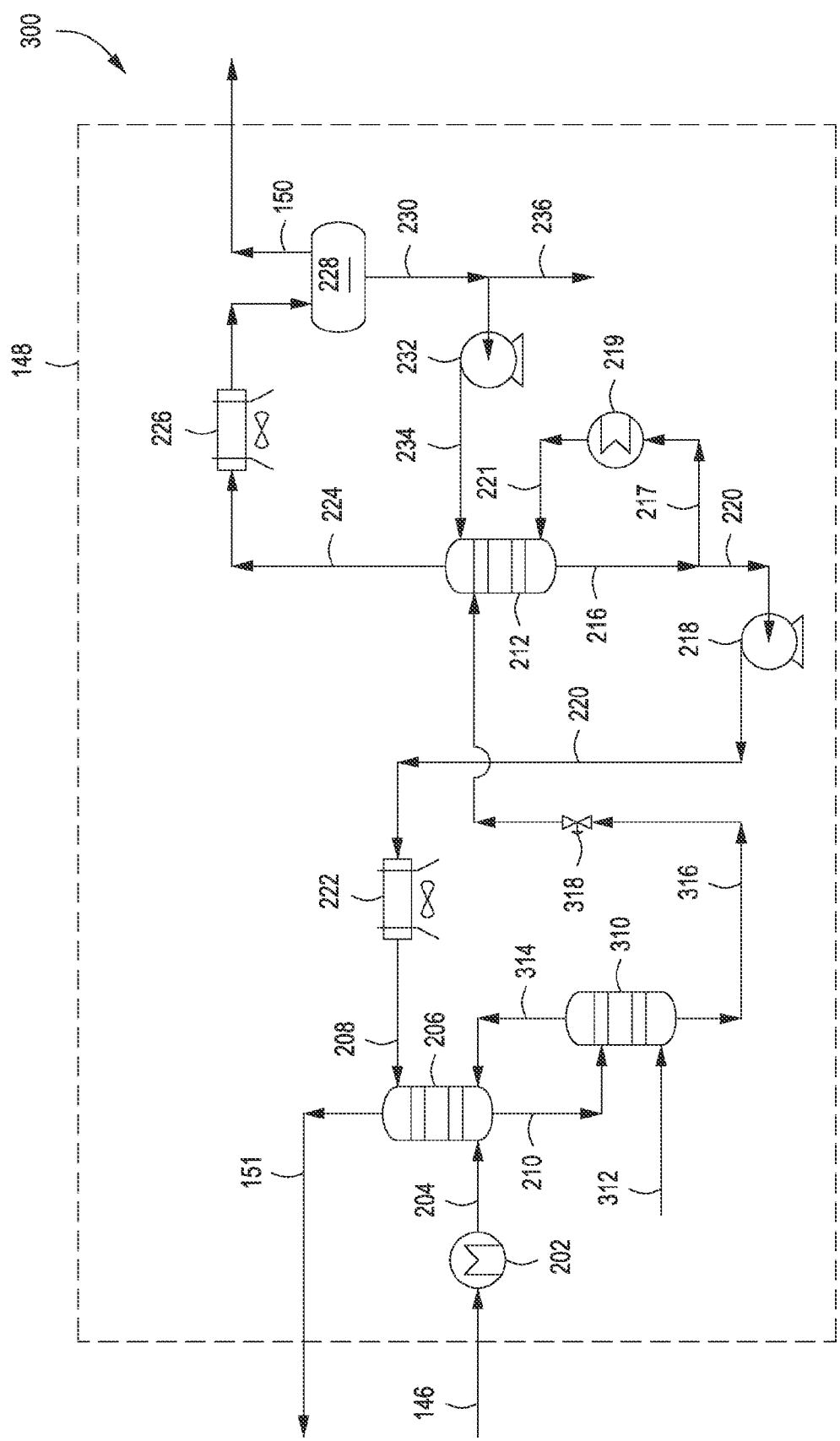
FIG. 3 depicts another illustrative $CO_2$ capture system incorporating a stripping section to remove volatiles prior to regeneration of the bicarbonate solvent solution and removal of $CO_2$.

Referring now to FIG. 3, depicted is an illustrative embodiment of a $CO_2$ separation system 300 according to the invention, similar in some respects to the system 200 of FIG. 2 but incorporating a stripping section to remove volatiles from the rich bicarbonate solution before regeneration of the solvent. As such, the entire system 300 will not be described in detail but may be best understood with reference to FIG. 2. As depicted in system 300 of FIG. 3, the rich bicarbonate solvent discharged from the bottom of the absorption column 206 via stream 210 can be directed to a stripping section 310, where volatile components may be stripped from the rich bicarbonate solvent using a vapor stream 312. The vapor stream 312 comprises a preferably clean vapor, which may be any vapor configured to remove volatile components that will not interact with $CO_2$. In some embodiments, the vapor stream 312 may comprise nitrogen, argon, steam, or combinations thereof. In one or more embodiments (not shown), the stripping section 310 may be incorporated as additional stages at the bottom of the absorption column 206. In other embodiments, the stripping section 310 may be a separate column from the absorption column as shown in FIG. 3. In one or more embodiments, the stripping section 310 operates at an elevated pressure similar to that of the cooled purge stream 204.

The stripping section 310 generates a first or overhead stream 314 comprising the stripping vapor and the volatile components stripped from the rich bicarbonate solution and a second stream 316 comprising the stripped bicarbonate solvent solution. The overhead stream 314 is recirculated to the absorption column 206, while the bicarbonate solvent solution in line 316 is directed the regeneration column 212. Line 316 may include a valve 318 disposed therein configured to flash the bicarbonate solvent to a lower, near-atmospheric pressure before introduction to the regeneration column 212. In at least one embodiment, the first valve 318 can be a hydraulic turbine configured to generate extra power. Complete solvent regeneration can then take place as described above with reference to system 200.

Figure 4:
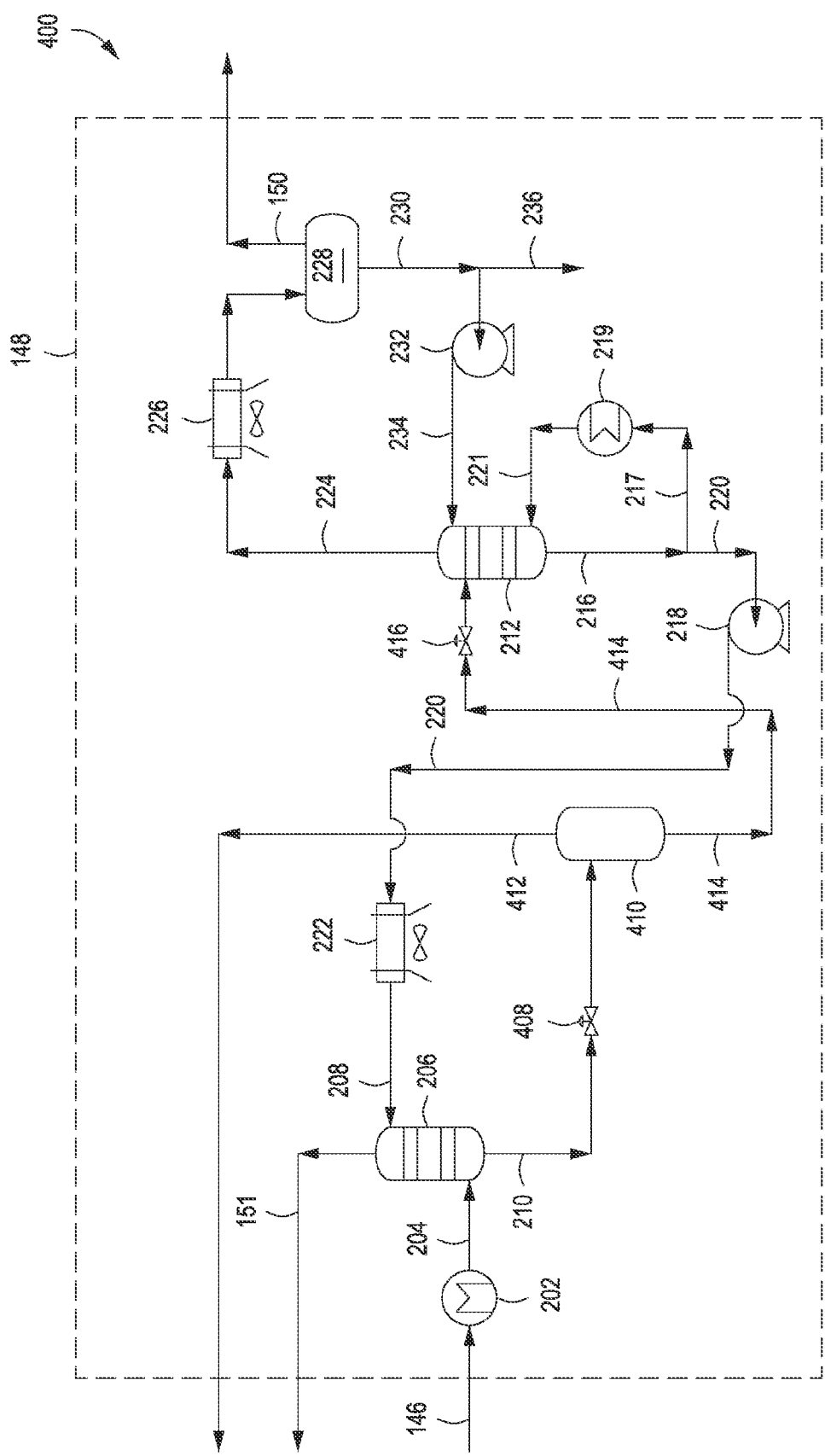
FIG. 4 depicts another illustrative $CO_2$ capture system incorporating a flash step to remove volatiles prior to regeneration of the bicarbonate solvent solution and removal of $CO_2$.

Referring now to FIG. 4, depicted is an illustrative embodiment of a $CO_2$ separation system 400 according to the invention, similar in some respects to the system 200 of FIG. 2 but incorporating a preliminary flash to an intermediate pressure to remove volatiles from the rich bicarbonate solution before regeneration of the solvent. As such, the entire system 400 will not be described in detail but may be best understood with reference to FIG. 2. As depicted in system 400 of FIG. 4, the rich bicarbonate solvent can be discharged from the bottom of the absorption column 206 via line 210 and reduced in pressure via a first valve 408 before being introduced into a flash vessel 410. In one or more embodiments, the first valve 408 can be configured to reduce the pressure of the bicarbonate solvent from a pressure at or near that of the cooled purge stream 204 to an intermediate pressure sufficient to release volatile components such as $N_2$, $O_2$, Ar, and CO from the bicarbonate solvent while keeping $CO_2$ in the liquid phase of the solution. The resulting reduced-pressure dual phase solvent solution exiting the first valve 408 may then be directed to the flash vessel 410, where the phases are separated. The gaseous phase of the reduced-pressure solvent solution, comprising the volatile components described previously, is removed from the flash vessel 410 via volatile stream 412, while the liquid phase of the reduced-pressure solvent solution is removed from the flash vessel via line 414 and directed to the regeneration column 212.

Figure 5:
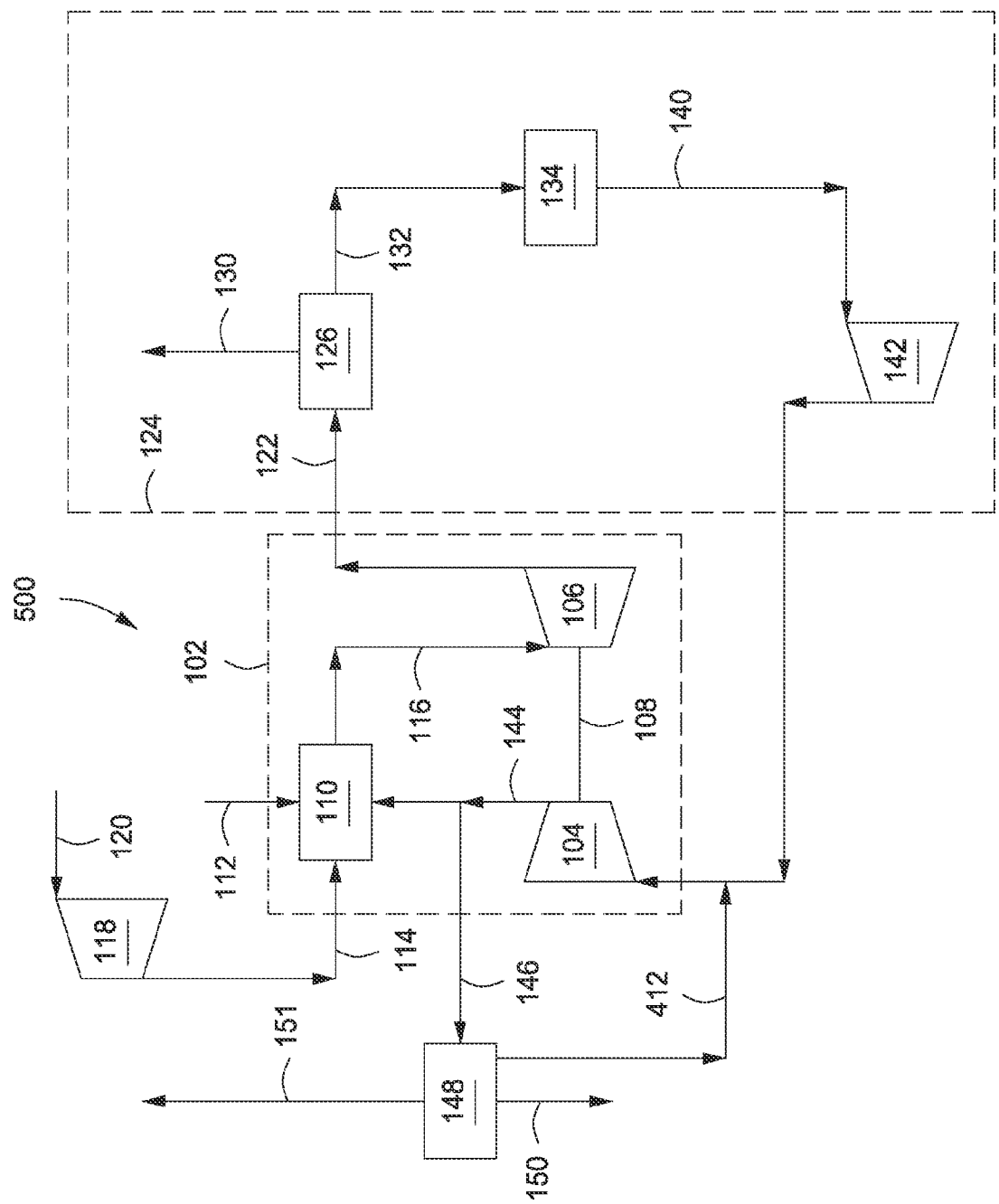
FIG. 5 depicts an integrated system for low emission power generation and enhanced $CO_2$ recovery in which volatiles removed in the $CO_2$ capture system are recycled to the exhaust gas recirculation system.

In one or more embodiments, volatile stream 412 may be recycled to the exhaust gas recirculation system 124 (FIG. 1). For example, as illustrated in system 500 of FIG. 5, the volatile stream 412 may be recycled and added to the cooled recycle gas 140 before the cooled recycle gas 140 is directed to the main compressor 104.

Referring again to the system 400 of FIG. 4, the reduced-pressure solvent solution in line 414 may be flashed to a lower, near-atmospheric pressure using a second valve 416 before being directed into the regeneration column 212. Complete solvent regeneration can then take place as described above with reference to system 200.

At least one benefit derived from the separation systems 300 and 400 of FIGS. 3 and 4, respectively, is the ability to produce a pure or nearly pure $CO_2$ stream from the regeneration column 212. The contaminants present in the $CO_2$ stream in line 210 can include water and volatile gases (described above) dissolved into the circulating solvent. Because the systems of FIGS. 3 and 4 are adapted to remove essentially all of the volatile gases while keeping the $CO_2$ in the solution, the regeneration column 212 overhead stream 224 is left with essentially only high purity $CO_2$ and water. In one or more embodiments, a portion of the $CO_2$ in line 150 can optionally be directed into a purge line (not shown) and captured for non-EOR uses, such as chemical feedstock, food production, etc.

Certain embodiments and features have been described using a set of numerical upper limits and a set of numerical lower limits. It should be appreciated that ranges from any lower limit to any upper limit are contemplated unless otherwise indicated. All numerical values are considered to be "about" or "approximately" the stated value. Furthermore, all patents and other documents cited in this application are fully incorporated by reference to the extent such disclosure is not inconsistent with this application and for all jurisdictions in which such incorporation is permitted.

While the present disclosure may be susceptible to various modifications and alternative forms, the exemplary embodiments discussed above have been shown only by way of example. However, it should again be understood that the disclosure is not intended to be limited to the particular embodiments disclosed herein. Indeed, the present disclosure includes all alternatives, modifications, and equivalents falling within the true spirit and scope of the appended claims.

What is claimed is:

1. An integrated power generation system, comprising:
    a gas turbine system comprising a combustion chamber configured to combust a compressed oxidant and a fuel in the presence of a compressed recycle stream to generate a discharge stream that is expanded in an expander, thereby generating a gaseous exhaust stream;
    an exhaust gas recirculation system comprising a boost compressor and one or more cooling units fluidly coupled to the boost compressor, the boost compressor being configured to receive and increase the pressure of the gaseous exhaust stream and the one or more cooling units being configured to cool the gaseous exhaust stream and provide a cooled recycle gas to a main compressor, wherein the main compressor compresses the cooled recycle gas and generates the compressed recycle stream;
    a purge stream fluidly coupled to the compressed recycle stream having a heat exchanger configured to reduce the temperature of the purge stream and generate a cooled purge stream; and
    a $CO_2$ separation system fluidly coupled to the heat exchanger, the $CO_2$ separation system comprising:
        an absorption column configured to receive the cooled purge stream and absorb $CO_2$ from the cooled purge stream with a potassium carbonate solvent to generate a nitrogen-rich residual stream and a bicarbonate solvent solution;
        a first valve fluidly coupled to the absorption column configured to flash the bicarbonate solvent solution to a pressure sufficient to separate volatile components from the bicarbonate solvent solution, thereby generating a dual phase reduced-pressure solvent solution having a gaseous phase comprising the volatile components and a liquid phase comprising the bicarbonate solvent solution;
        a flash vessel fluidly coupled to the first valve configured to receive the reduced-pressure solvent solution and remove the gaseous phase of the reduced-pressure solvent solution from the liquid phase of the reduced-pressure solvent solution, wherein at least a portion of the gaseous phase of the reduced-pressure solution removed from the flash vessel is recycled to the exhaust gas recirculation system;
        a second valve fluidly coupled to the flash vessel configured to receive the liquid phase of the reduced-pressure solvent solution and flash the liquid phase to a near-atmospheric pressure, thereby generating a near-atmospheric bicarbonate solvent solution; and
        a regeneration column fluidly coupled to the second valve configured to receive and boil the near-atmospheric bicarbonate solvent solution to remove $CO_2$ and water therefrom, producing a regenerated potassium carbonate solvent to be recycled to the absorption column.

2. The system of claim 1, wherein the first valve is configured to flash the bicarbonate solvent solution to a pressure such that the gaseous phase of the bicarbonate solvent solution comprises less than 1.0 mol % carbon dioxide.

3. The system of claim 2, wherein the first valve is configured to flash the bicarbonate solvent solution to a pressure such that at least 98 mol % of the total carbon dioxide in the bicarbonate solvent solution remains in the liquid phase of the reduced-pressure solvent solution.

4. The system of claim 1, further comprising a reboiler fluidly coupled to the regeneration column and configured to receive and heat a portion of the regenerated potassium carbonate solvent and produce a heated regenerated potassium carbonate solvent.

5. The system of claim 4, wherein the reboiler is configured to recycle the heated regenerated potassium carbonate solvent to the regeneration column to produce steam.

6. The system of claim 1, further comprising a condenser fluidly coupled to the regeneration column configured to receive the $CO_2$ and water removed from the bicarbonate solvent solution and separate the water from the $CO_2$.

7. The system of claim 6, wherein a portion of the water separated from the $CO_2$ is pumped back to the regeneration column to create steam.

8. The system of claim 1, wherein the at least a portion of the gaseous phase of the reduced-pressure solution recycled to the exhaust gas recirculation system is combined with the cooled recycle gas provided to the main compressor.

9. The system of claim 1, wherein the combustion chamber is configured to stoichiometrically combust the compressed oxidant and the fuel in the presence of the compressed recycle stream.

10. The system of claim 1, wherein the compressed recycle stream acts as a diluent configured to moderate the temperature of the discharge stream.

11. The system of claim 1, wherein one or both of the first and second valves is a hydraulic turbine configured to generate power.

12. A method for generating power, comprising:
combusting a compressed oxidant and a fuel in a combustion chamber and in the presence of a compressed recycle stream, thereby generating a discharge stream, and expanding the discharge stream to generate a gaseous exhaust stream;
increasing the pressure of the gaseous exhaust stream and cooling the gaseous exhaust stream to generate a cooled recycle gas that is compressed to generate the compressed recycle stream;
cooling a purge stream fluidly coupled to the compressed recycle stream to generate a cooled purge stream;
directing the cooled purge stream to an absorption column and absorbing $CO_2$ from the cooled purge stream with a potassium carbonate solvent;
discharging a nitrogen-rich residual stream and a bicarbonate solvent solution from the absorption column;
flashing the bicarbonate solvent solution to a pressure sufficient to separate volatile components from the bicarbonate solvent solution, generating a dual phase reduced-pressure solvent solution having a gaseous phase comprising the volatile components and a liquid phase comprising the bicarbonate solvent solution;
separating the gaseous phase of the reduced-pressure solvent solution from the liquid phase of the reduced-pressure solution, wherein at least a portion of the gaseous phase of the reduced-pressure solvent solution is recycled and combined with the cooled recycle gas;
flashing the liquid phase of the reduced-pressure solvent solution to a near-atmospheric pressure to generate a near-atmospheric solvent solution;
boiling the near-atmospheric solvent solution in a regeneration column to remove $CO_2$ and water therefrom, thereby generating a regenerated potassium carbonate solvent; and
recycling the regenerated potassium carbonate solvent to the absorption column.

13. The method of claim 12, wherein the bicarbonate solution is flashed to a pressure such that the gaseous phase of the reduced-pressure solvent solution comprises less than 1.0 mol % $CO_2$.

14. The method of claim 13, wherein the bicarbonate solution is flashed to a pressure such that at least 98 mol % of the total $CO_2$ in the bicarbonate solvent solution remains in the liquid phase of the reduced-pressure solvent solution.

15. The method of claim 12, further comprising receiving the $CO_2$ and water removed from the near-atmospheric solvent solution in a condenser fluidly coupled to the regeneration column and separating the water from the $CO_2$.

16. The method of claim 15, wherein a portion of the water separated from the $CO_2$ in the condenser is directed to the regeneration column to create steam.

17. The method of claim 12, wherein the compressed oxidant and the fuel are combusted in the presence of the compressed recycle stream under stoichiometric conditions.

18. The method of claim 12, wherein the compressed recycle stream moderates the temperature of the discharge stream.

19. An integrated power generation system, comprising:
a gas turbine system comprising a combustion chamber configured to combust a compressed oxidant and a fuel in the presence of a compressed recycle stream to generate a discharge stream that is expanded in an expander, thereby generating a gaseous exhaust stream;
an exhaust gas recirculation system comprising a boost compressor and one or more cooling units fluidly coupled to the boost compressor, the boost compressor being configured to receive and increase the pressure of the gaseous exhaust stream and the one or more cooling units being configured to cool the gaseous exhaust stream and provide a cooled recycle gas to a main compressor, wherein the main compressor compresses the cooled recycle gas and generates the compressed recycle stream;
a purge stream fluidly coupled to the compressed recycle stream having a heat exchanger configured to reduce the temperature of the purge stream and generate a cooled purge stream; and
a $CO_2$ separation system fluidly coupled to the heat exchanger, the $CO_2$ separation system comprising:
an absorption column configured to receive the cooled purge stream and absorb $CO_2$ from the cooled purge stream with a potassium carbonate solvent to generate a nitrogen-rich residual stream and a bicarbonate solvent solution;
a first valve fluidly coupled to the absorption column configured to flash the bicarbonate solvent solution to a pressure sufficient to separate volatile components from the bicarbonate solvent solution and such that the gaseous phase of the bicarbonate solvent solution comprises less than 1.0 mol % carbon dioxide, thereby generating a dual phase reduced-pressure solvent solution having a gaseous phase comprising the volatile components and a liquid phase comprising the bicarbonate solvent solution;
a flash vessel fluidly coupled to the first valve configured to receive the reduced-pressure solvent solution and remove the gaseous phase of the reduced-pressure solvent solution from the liquid phase of the reduced-pressure solvent solution;
a second valve fluidly coupled to the flash vessel configured to receive the liquid phase of the reduced-pressure solvent solution and flash the liquid phase to a near-atmospheric pressure, thereby generating a near-atmospheric bicarbonate solvent solution; and a regeneration column fluidly coupled to the second valve configured to receive and boil the near-atmospheric bicarbonate solvent solution to remove $CO_2$ and water therefrom, producing a regenerated potassium carbonate solvent to be recycled to the absorption column.

20. The system of claim 19, wherein the first valve is configured to flash the bicarbonate solvent solution to a pressure such that at least 98 mol % of the total carbon dioxide in the bicarbonate solvent solution remains in the liquid phase of the reduced-pressure solvent solution.

21. The system of claim 19, further comprising a reboiler fluidly coupled to the regeneration column and configured to receive and heat a portion of the regenerated potassium carbonate solvent and produce a heated regenerated potassium carbonate solvent.

22. The system of claim 21, wherein the reboiler is configured to recycle the heated regenerated potassium carbonate solvent to the regeneration column to produce steam.

23. The system of claim 19, further comprising a condenser fluidly coupled to the regeneration column configured to receive the $CO_2$ and water removed from the bicarbonate solvent solution and separate the water from the $CO_2$.

24. The system of claim 23, wherein a portion of the water separated from the $CO_2$ is pumped back to the regeneration column to create steam.

25. The system of claim 19, wherein the at least a portion of the gaseous phase of the reduced-pressure solution recycled to the exhaust gas recirculation system is combined with the cooled recycle gas provided to the main compressor.

26. The system of claim 19, wherein the combustion chamber is configured to stoichiometrically combust the compressed oxidant and the fuel in the presence of the compressed recycle stream.

27. The system of claim 19, wherein the compressed recycle stream acts as a diluent configured to moderate the temperature of the discharge stream.

28. The system of claim 19, wherein one or both of the first and second valves is a hydraulic turbine configured to generate power.

29. A method for generating power, comprising:

combusting a compressed oxidant and a fuel in a combustion chamber and in the presence of a compressed recycle stream, thereby generating a discharge stream, and expanding the discharge stream to generate a gaseous exhaust stream;

increasing the pressure of the gaseous exhaust stream and cooling the gaseous exhaust stream to generate a cooled recycle gas that is compressed to generate the compressed recycle stream;

cooling a purge stream fluidly coupled to the compressed recycle stream to generate a cooled purge stream;

directing the cooled purge stream to an absorption column and absorbing $CO_2$ from the cooled purge stream with a potassium carbonate solvent;

discharging a nitrogen-rich residual stream and a bicarbonate solvent solution from the absorption column;

flashing the bicarbonate solvent solution to a pressure sufficient to separate volatile components from the bicarbonate solvent solution and to a pressure such that the gaseous phase of the reduced-pressure solvent solution comprises less than 1.0 mol % $CO_2$, generating a dual phase reduced-pressure solvent solution having a gaseous phase comprising the volatile components and a liquid phase comprising the bicarbonate solvent solution;

separating the gaseous phase of the reduced-pressure solvent solution from the liquid phase of the reduced-pressure solution, wherein at least a portion of the gaseous phase of the reduced-pressure solvent solution is recycled and combined with the cooled recycle gas;

flashing the liquid phase of the reduced-pressure solvent solution to a near-atmospheric pressure to generate a near-atmospheric solvent solution;

boiling the near-atmospheric solvent solution in a regeneration column to remove $CO_2$ and water therefrom, thereby generating a regenerated potassium carbonate solvent; and recycling the regenerated potassium carbonate solvent to the absorption column.

30. The method of claim 29, wherein the bicarbonate solution is flashed to a pressure such that at least 98 mol % of the total $CO_2$ in the bicarbonate solvent solution remains in the liquid phase of the reduced-pressure solvent solution.

31. The method of claim 29, further comprising receiving the $CO_2$ and water removed from the near-atmospheric solvent solution in a condenser fluidly coupled to the regeneration column and separating the water from the $CO_2$.

32. The method of claim 31, wherein a portion of the water separated from the $CO_2$ in the condenser is directed to the regeneration column to create steam.

33. The method of claim 29, wherein the compressed oxidant and the fuel are combusted in the presence of a compressed recycle stream under stoichiometric conditions.

34. The method of claim 29, wherein the compressed recycle stream moderates the temperature of the discharge stream.

* * * * *